United States Patent
Zurmühlen et al.

(10) Patent No.: US 10,801,631 B2
(45) Date of Patent: Oct. 13, 2020

(54) PRESSURE-LIMITING UNIT FOR A PRESSURE BOOSTER AS WELL AS A PRESSURE BOOSTER FOR DRIVING HYDRAULIC TOOLS

(71) Applicant: TKR Spezialwerkzeuge GmbH, Gevelsberg (DE)

(72) Inventors: Martin Zurmühlen, Bochum (DE); Heinz Enriquez, Witten (DE)

(73) Assignee: TKR Spezialwerkzeuge GmbH, Gevelsberg (DE)

( * ) Notice: Subject to any disclaimer, the term of this patent is extended or adjusted under 35 U.S.C. 154(b) by 41 days.

(21) Appl. No.: 16/171,520

(22) Filed: Oct. 26, 2018

(65) Prior Publication Data

US 2019/0128437 A1    May 2, 2019

(30) Foreign Application Priority Data

Oct. 27, 2017   (DE) .......................... 10 2017 125 250

(51) Int. Cl.
*F16K 17/06* (2006.01)
*B21J 15/22* (2006.01)
(Continued)

(52) U.S. Cl.
CPC ............... *F16K 17/06* (2013.01); *B21J 15/22* (2013.01); *F01B 25/10* (2013.01); *F04B 9/12* (2013.01);
(Continued)

(58) Field of Classification Search
CPC . F15B 3/00; F15B 5/00; F15B 11/0725; B21J 15/22; Y10T 137/7878
See application file for complete search history.

(56) References Cited

U.S. PATENT DOCUMENTS

| | | |
|---|---|---|
| 2,938,347 A | 5/1960 | Sturgis |
| 4,548,233 A | 10/1985 | Wolfges |

(Continued)

FOREIGN PATENT DOCUMENTS

| | | |
|---|---|---|
| DE | 41 08 080 C2 | 8/2001 |
| DE | 10 2017 111 657 B3 | 8/2018 |

(Continued)

*Primary Examiner* — Michael Leslie
(74) *Attorney, Agent, or Firm* — Nixon Peabody LLP

(57) ABSTRACT

A pressure-limiting unit for a pressure booster for driving hydraulic tools. The unit includes a pneumatic unit that is driven by gas or air pressure, a hydraulic unit connected to the pneumatic unit and having a hydraulic port for connecting the hydraulic tool to the hydraulic unit in a fluid-tight manner and a pressure-limiting valve for adjusting the hydraulic pressure. The unit includes a closing element pushed against a valve seat by a spring element and having a displaceable adjusting element for adjusting the spring force of the spring element. To provide a pressure-limiting unit and a pressure booster for driving hydraulic tools with a pressure-limiting unit, which offer the possibility of making a precise adjustment of the hydraulic pressure in a simple way, the pressure-limiting unit includes a position detection unit connected to the adjusting element to detect the axial position of the adjusting element, an evaluation unit for determining the set hydraulic pressure as a function of the axial position, and an output unit for displaying the set hydraulic pressure.

6 Claims, 3 Drawing Sheets

(51) Int. Cl.
*F16K 37/00* (2006.01)
*F15B 13/02* (2006.01)
*F15B 11/072* (2006.01)
*F01B 25/10* (2006.01)
*F04B 9/12* (2006.01)
*F15B 3/00* (2006.01)
*F15B 11/032* (2006.01)
*F15B 13/04* (2006.01)

(52) U.S. Cl.
CPC ............ *F15B 3/00* (2013.01); *F15B 11/0725* (2013.01); *F15B 13/024* (2013.01); *F16K 37/0041* (2013.01); *F15B 11/032* (2013.01); *F15B 2013/0409* (2013.01); *F15B 2211/216* (2013.01); *F15B 2211/50518* (2013.01); *F15B 2211/523* (2013.01); *F15B 2211/55* (2013.01); *F15B 2211/634* (2013.01); *F15B 2211/775* (2013.01)

(56) References Cited

U.S. PATENT DOCUMENTS

2016/0230786 A1\* 8/2016 Nema ................. F15B 11/0725
2018/0340552 A1\* 11/2018 Kreischer ........... F15B 11/0725
2018/0340553 A1\* 11/2018 Zurmuehlen ....... F15B 11/0725

FOREIGN PATENT DOCUMENTS

| EP | 0100784 | A1 | 2/1984 |
| EP | 1970787 | A2 | 9/2008 |
| WO | 9956047 | A2 | 11/1999 |
| WO | 0142693 | A1 | 6/2001 |

\* cited by examiner

PRESSURE-LIMITING UNIT FOR A PRESSURE BOOSTER AS WELL AS A PRESSURE BOOSTER FOR DRIVING HYDRAULIC TOOLS

This application claims the benefit of Germany Patent Application No. 10 2017 125 250.9, filed Oct. 27, 2017, which is incorporated herein by reference in its entirety.

The invention relates to a pressure-limiting unit for a pressure booster and to a pressure booster for driving hydraulic tools, comprising
- a pneumatic unit that is driven by gas or air pressure,
- a hydraulic unit that is connected to the pneumatic unit and that has a hydraulic port for connecting the hydraulic tool to the hydraulic unit in a fluid-tight manner, and
- a pressure-limiting valve for setting the hydraulic pressure, comprising
  - a closing element that is pushed against a valve seat by a spring element, and
  - a displaceable adjusting element for setting the spring force of the spring element.

Pressure boosters of the aforementioned type are known in various embodiments from the prior art. For example, they are used to provide hydraulic tools, which are used for example for punching, riveting, clinching or joining, with the hydraulic pressure they require for the respective work processes that are to be carried out. Compressed air is normally used to drive the pressure boosters, wherein this permits the pressure booster to convert a pneumatic low pressure in the range of e.g. 2-10 bar into hydraulic high pressure of 100-600 bar. The hydraulic pressure that is provided serves to drive working pistons of the hydraulic tools, which can be connected to the pressure booster and which can be connected in a fluid-tight manner to the hydraulic port of the hydraulic unit.

Generic pressure boosters are employed in automobile repair shops, for example, to drive hydraulic punching and riveting devices that can be used during vehicle repairs. The pressure boosters are supplied by the compressed air lines, which are usually present in automobile repair shops and to which the pressure boosters with their pneumatic unit can be directly connected. With consistently high pneumatic pressure, it is then possible to ensure a reliable operation of the pressure booster and a hydraulic tool that is connected to the pressure booster.

Depending upon the hydraulic tool to be used and the processing operation to be carried out with said hydraulic tool, the hydraulic pressure that is required for the respective processing operation and maximum available at the hydraulic port should be set on the pressure booster. Known pressure boosters have pressure-limiting valves for this purpose, which perform the task of releasing an inner so-called short circuit fluid circulation system at a particular pre-set maximum pressure so that the maximum permissible pressures cannot be exceeded during the processing operation.

A precise setting of this maximum hydraulic pressure by means of the pressure-limiting valve is of vital importance in order to ensure that the processing operation that is to be carried out can be completed with the required standard of quality. If the pressure-limiting valve is opened too early, the processing operation will not be carried out with the necessary hydraulic pressure, which, in a riveting process, for instance, could result in the connection not having the required strength. Opening the pressure-limiting valve too late, on the other hand, can lead to damage to the workpiece or workpieces to be processed.

To set the maximum hydraulic pressure for the respective processing operation, known pressure-limiting valves have a closing element that is pressed, preferably axially, into a valve seat by a spring element. The spring force applied by the spring element determines the maximum hydraulic pressure that is available at the hydraulic port, namely the pressure at which the closing element is displaced against the valve seat counter to the spring force and thereby releases the short circuit fluid circulation system.

Furthermore, known pressure-limiting valves already have the possibility of establishing the spring force by means of an adjusting element, on which the spring element is supported and which can be displaced in the direction of the valve seat, also preferably axially, whereby it is possible to vary the hydraulic pressure at which the pressure-limiting valve opens. However, the known pressure-limiting valves have the disadvantage that they do not offer the possibility of recognizing the hydraulic pressure set by the positioning of the adjusting element. Available scaling does not allow for credible conclusions to be drawn about the setting of the hydraulic pressure, and so a reliable setting of the hydraulic pressure can take place only with the aid of separate pressure transducers, which make it possible to determine the hydraulic pressure that has been set by means of the adjustable pressure-limiting valve.

Proceeding from this basis, it is the object of the invention to provide a pressure-limiting unit and a pressure booster for driving hydraulic tools, which offer the possibility of making a precise adjustment of the hydraulic pressure in a simple way.

The invention solves the object by means of a pressure booster and a pressure-limiting unit for a pressure booster having the features disclosed herein. Advantageous further embodiments of the pressure booster are indicated herein.

The pressure booster according to the invention is characterized by
- a position detection unit that is connected to the adjusting element to detect the position, in particular the axial position of the adjusting element,
- an evaluation unit for determining the set hydraulic pressure as a function of the position, in particular the axial position of the adjusting element, and
- an output unit for displaying the set hydraulic pressure.

According to the invention, the pressure booster has a position detection unit, which is connected with the adjusting element of the pressure-limiting valve in such a way that the exact position of the adjusting element of the pressure-limiting valve can be determined by means of the position detection unit. Using the position of the adjusting element, the setting of the spring element and thus of the set hydraulic pressure can be determined directly. Depending upon the position of the closing element, the spring element is more or less heavily pre-tensioned and thus determines the set hydraulic pressure by its position. Preferably, the adjusting element is displaced in the axial direction, wherein the axial position of the adjusting element, which determines the set hydraulic pressure, is then ascertained.

To convert the position, preferably the axial position, into the set hydraulic pressure, the position detection unit is coupled with an evaluation unit, which associates the position of the adjusting element with the maximum hydraulic pressure that is thereby set. According to one advantageous embodiment of the invention, a microcontroller is arranged in the evaluation unit. Hydraulic pressures that are associated with the various positions, preferably axial positions of the adjusting element, are saved in the microcontroller. To this end, data can be saved in the microcontroller that, for instance, associates a hydraulic pressure with an axial position. The data can have been previously measured by experiment, for example, and thus permit an exact association of the position to the hydraulic pressure. By means of a mathematical interpolation, it is also possible to use the microcontroller to associate with a hydraulic pressure those positions that have not been recorded in the data. Depending upon the extent of the data stored in the microcontroller, the precision of the evaluation unit can be increased in the process. Moreover, the microcontroller ensures to consider influencing factors, such as temperature-dependent factors, when determining the hydraulic pressure, wherein these factors can likewise be processed in the microcontroller.

The set hydraulic pressure or respectively a force that depends upon it are then displayed via an output unit that is linked with the evaluation unit and which directly indicates to a user, inter alia, the hydraulic pressure that has been set at the pressure-limiting valve, the corresponding force and/or the like.

The embodiment of the pressure booster according to the invention makes it possible to set the hydraulic pressure required for the respective work process in a simple way by means of the pressure-limiting valve. The set hydraulic pressure is thus displayed directly to the user on the output unit, and so the user does not need to attempt to determine whether the setting of the pressure-limiting valve corresponds to the required hydraulic pressure. The position, in particular the axial position of the adjusting element, can be reliably converted into the corresponding hydraulic pressure using the evaluation unit, wherein the evaluation unit can also take influencing factors such as temperature into account in the process so that a very precise setting of the hydraulic pressure and thus a very reliable execution of the work processes can take place.

The configuration of the position detection unit can basically be freely selected. According to an especially advantageous embodiment of the invention, however, it is provided that the position detection unit has a positional potentiometer, which is connected to the adjusting element. The use of a positional potentiometer is distinguished by the fact that an exact position detection of the adjusting element, in particular the axial positioning when it is displaced axially, can be carried out with this device in a very simple and cost-effective way. The positional potentiometer here is connected with the adjusting element in such a way that an axial displacement of the adjusting element is accompanied by a corresponding displacement of the positional potentiometer. Moreover, the positional potentiometer offers the advantage that the change in resistance that can usually be detected with the positional potentiometer can be processed by the evaluation unit in a simple way, wherein the resistance changes, taking temperature-dependent factors into account where appropriate, are converted into the set hydraulic pressure.

As has already been described above, the position detection unit is linked with an advantageously provided microcontroller of the evaluation unit, which associates the position of the adjusting element, preferably its axial position during an axial displacement, with a set hydraulic pressure. The use of a microcontroller is distinguished by the fact that, in addition to the possibility of associating the detected position with stored data by means of an interpolation, it is also possible to associate a hydraulic pressure with those positions that are not stored in the microcontroller. In addition, further influencing factors can also have a bearing during the conversion of the axial position into the hydraulic pressure. Furthermore, the microcontroller can be manufactured especially easily and cost-effectively and thereby permits an especially cost-effective production of the pressure booster according to the invention.

The representation of the hydraulic pressure detected in the evaluation unit can basically occur in any given way, wherein the possibility of an acoustic signal also exists. According to an especially advantageous embodiment of the invention, however, it is provided that the evaluation unit is connected to a display, in particular an E Ink display of the output unit.

The use of a display, in particular an E Ink display, permits a representation of the set hydraulic pressure that is particularly easy to read, and so the user is provided with a convenient option of setting the required hydraulic pressure in a simple way. The use of an E Ink display screen is distinguished by the fact that it has only a low power requirement and additionally permits the display of the set hydraulic pressure even in a de-energized state. The overall use of electrical energy is especially low as a result.

Essential to the operation of the pressure booster is a supply of gas or air pressure to drive the pneumatic unit. In cases where an electrical position detection unit, evaluation unit and/or output unit are used, it is additionally necessary to provide the pressure booster with electrical energy. An energy supply such as this is fundamentally unproblematic when a sufficient supply of electrical energy is available at the operation site of the pressure booster. If this is not the case, then the setting can still be made beforehand at another location with a sufficient energy supply, but a change to the set hydraulic pressure during operation is not readily possible. In this instance, there is also no option of electronically documenting the work processes by an especially advantageously provided memory unit.

According to one advantageous embodiment of the invention, it is thus provided that the evaluation unit, the position detection unit and/or the output unit are linked with a compressed air generator that is connected to a compressed air inlet of the pneumatic unit. According to this development of the invention, it is possible to drive a compressed air generator, which generates electrical energy, via the compressed air inlet by which the pneumatic unit is supplied with compressed air. This occurs, for example, by means of a generator wheel that is driven by the compressed air current and that produces electrical energy during the operation of the pneumatic unit, i.e. when streaming air through a compressed air line that is connected to the compressed air inlet, wherein the electrical energy can be used to provide sufficient electrical energy for the evaluation unit, the position detection unit and/or the output unit and possibly also a memory unit.

Owing to this development of the invention, it is possible to forgo an external energy supply. The compressed air generator thus generates a sufficient amount of energy to supply the evaluation unit, the position detection unit and the output unit with sufficient power. As a result of this development, the pressure booster according to the invention is not dependent upon an external energy supply and relies solely on a supply of compressed air or respectively gas pressure to operate. The compressed air generator can be integrated, for example, into the existing pneumatic line within the pressure booster in a simple and convenient way. From there, the consumers can be supplied with electricity via suitable lines.

A temporary energy supply, i.e. available during the setting, is generally sufficient for the operation of the position detection unit, the evaluation unit and the output unit. This temporary energy supply can readily be provided by the compressed air generator during the setting process. According to an especially advantageous embodiment of the invention, however, it is provided that the compressed air generator is connected to an energy storage unit.

The energy storage unit can be a battery, for example, which also provides the consumers with energy when the compressed air generator is inactive. The consumers in this case are also connected to the energy storage unit in order to receive energy necessary for their operation as needed.

The concrete configuration of the pressure-limiting valve and its connection with the adjusting element and with the position detection unit can generally be freely selected. According to an especially advantageous embodiment of the invention it is, however, provided that the spring element is braced against a running sleeve that is connected to the position detection unit and that is mounted on a valve housing of the pressure-limiting valve such that it can be displaced axially. According to this embodiment of the invention, the running sleeve forms the adjusting element, and the pre-tension of the spring element and thus of the maximum hydraulic pressure can be set using its position. The running sleeve is mounted on the valve housing of the pressure-limiting valve such that it is axially displaceable, and so an exact positioning of the running sleeve relative to the pressure-limiting valve can be performed, and thus a very precise setting of the spring element can be carried out. The guide of the running sleeve on the valve housing additionally offers the advantage that the pressure-limiting valve can have an especially compact configuration. To determine the axial position, the running sleeve is connected directly to the position detection unit in order to permit a very precise detection of the axial position.

In doing so an axial displacement of the adjusting element, in particular the running sleeve, can take place in basically any desired way. According to an especially advantageous embodiment of the invention it is, however, provided that the running sleeve rests against a rotary handle, which is arranged on a threaded section of the pressure-limiting valve.

According to this embodiment of the invention, a rotation of the rotary handle causes an axial displacement of the running sleeve on the valve housing, wherein the running sleeve is displaced in the direction of the valve housing, e.g. it is moved down from it, depending upon the direction of rotation, wherein the pre-tension of the spring element is set in this way. The use of a rotary handle is distinguished by the fact that the running sleeve can be positioned very precisely, whereby a very good option for setting the hydraulic pressure is provided.

The spring element of the pressure-limiting valve can generally be configured in any desired way. According to an especially advantageous embodiment of the invention, however, the spring element is formed by a helical compression spring, which rests against the closing element at one end and is braced against the running sleeve at the other end, i.e. it is in a mechanical operation connection with the running sleeve. A particularly simple and cost-effective design of the pressure-limiting valve and thus of the pressure booster is achieved from this embodiment of the invention. Setting the spring force by establishing the longitudinal extent of the spring element between the running sleeve and the closing element is possible in an especially simple way.

The invention further solves the object with a pressure-limiting unit for a pressure booster for driving hydraulic tools, comprising a pressure-limiting valve for setting the hydraulic pressure, wherein said pressure-limiting valve has a closing element that is pushed against a valve seat by a spring element and has a displaceable adjusting element for adjusting the spring force of the spring element.

Characterizing for the pressure-limiting unit according to the invention is a position detection unit that is connected to the adjusting element to detect the position of the adjusting element, an evaluation unit for determining the set hydraulic pressure as a function of the position of the adjusting element and an output unit for displaying the set hydraulic pressure, the corresponding force or the like. Is it especially preferred that the axial position of the adjusting element is determined when it is axially displaceably mounted to set the hydraulic pressure, wherein the spring element is then pressed axially against the valve seat.

According to the invention, the pressure-limiting unit hence has a position detection unit, an evaluation unit and an output unit. The position detection unit makes it possible to determine with precision the position, where possible the axial position, of the adjusting element and thus to determine the set hydraulic pressure. The position, where possible the axial position, of the adjusting element is relayed from the position detection unit to an evaluation unit, which converts the position into a set hydraulic pressure.

The evaluation unit can have a microcontroller for this purpose, for example, which associates individual positions, where possible axial positions, with corresponding hydraulic pressures using stored data. When the adjusting element is arranged in the area between two positions to which a hydraulic pressure is associated in the microcontroller, the microcontroller is also well-suited to associating a hydraulic pressure with this position by interpolation. Additionally, with the microcontroller it is possible to take influencing factors such as temperature into consideration when determining the hydraulic pressure.

The set hydraulic pressure is then displayed via the output unit, which is equipped e.g. with a display for this purpose and thus offers the user a convenient display of the set hydraulic pressure immediately when it is set.

An exemplary embodiment of the invention is explained below with reference to the drawings. In the drawings.

Figure 1:
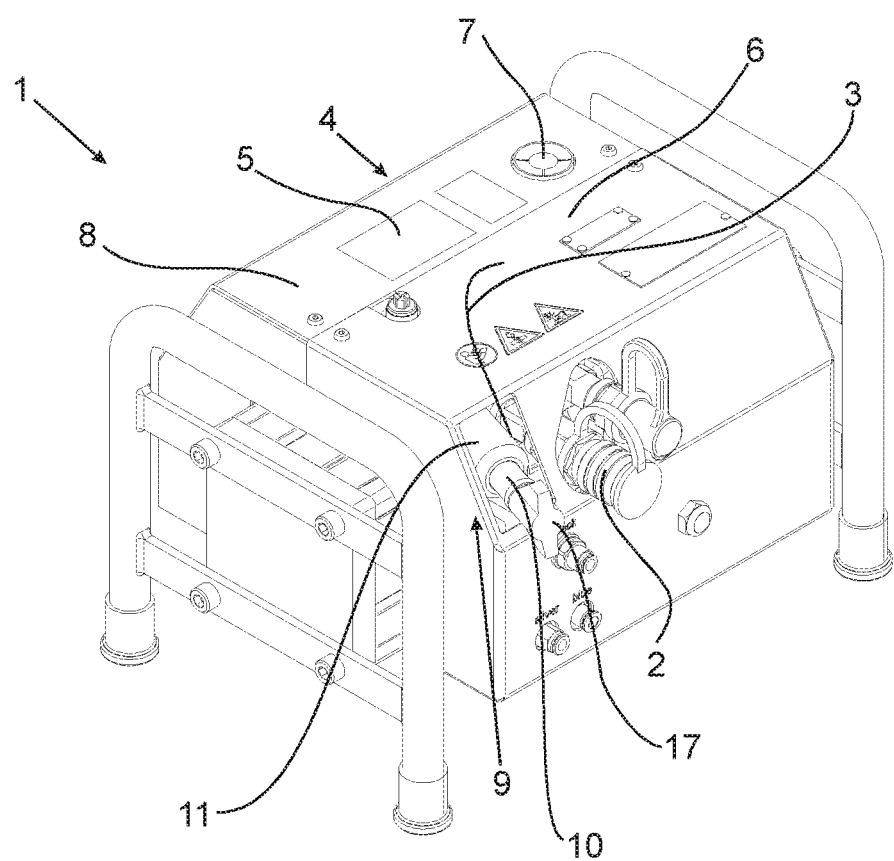
FIG. 1 shows a perspective view of a pressure booster.

FIG. 1 shows an embodiment of a pressure booster 1 in a perspective representation. On its opposite side, which is not visible here, the pressure booster 1 has a compressed air inlet that is connected via a pneumatic system line to an internal hydraulic unit, in which the pneumatic pressure is converted into a hydraulic pressure. The generated hydraulic pressure can then be used via a hydraulic port 2 to operate hydraulic tools that are not shown here, such as hydraulically driven riveting tools.

Depending upon the work process that is to be carried out with the hydraulic tool to be attached, the hydraulic pressure applied at the hydraulic port 2 must be limited to a maximum value, wherein the hydraulic pressure must be set such that the work process is carried out with the required force but such that a maximum force is not exceeded in order to prevent damage to the workpieces. The pressure booster 1 has a pressure-limiting valve 9 for this purpose. In a valve interior of a valve housing 14, the pressure-limiting valve 9 has a closing element that is braced against a spring element 20 and that blocks a valve seat arranged in the valve housing 14. An adjusting element in the form of a running sleeve 10 can be displaced in the axial direction by means of a rotary handle 17, wherein the spring element 20, is braced against the running sleeve 10. Accordingly, the spring force with which the closing element presses against the valve seat depends upon the axial position of the running sleeve 10. Rotating the rotary handle 17 in such a way that the running sleeve 10 is displaced toward a guide sleeve 11 increases the spring force and thus the set hydraulic pressure, whereas rotating the rotary handle 17 in such a way that the running sleeve 10 is moved in the opposite direction reduces the spring force and thus the set hydraulic pressure.

Figure 2:
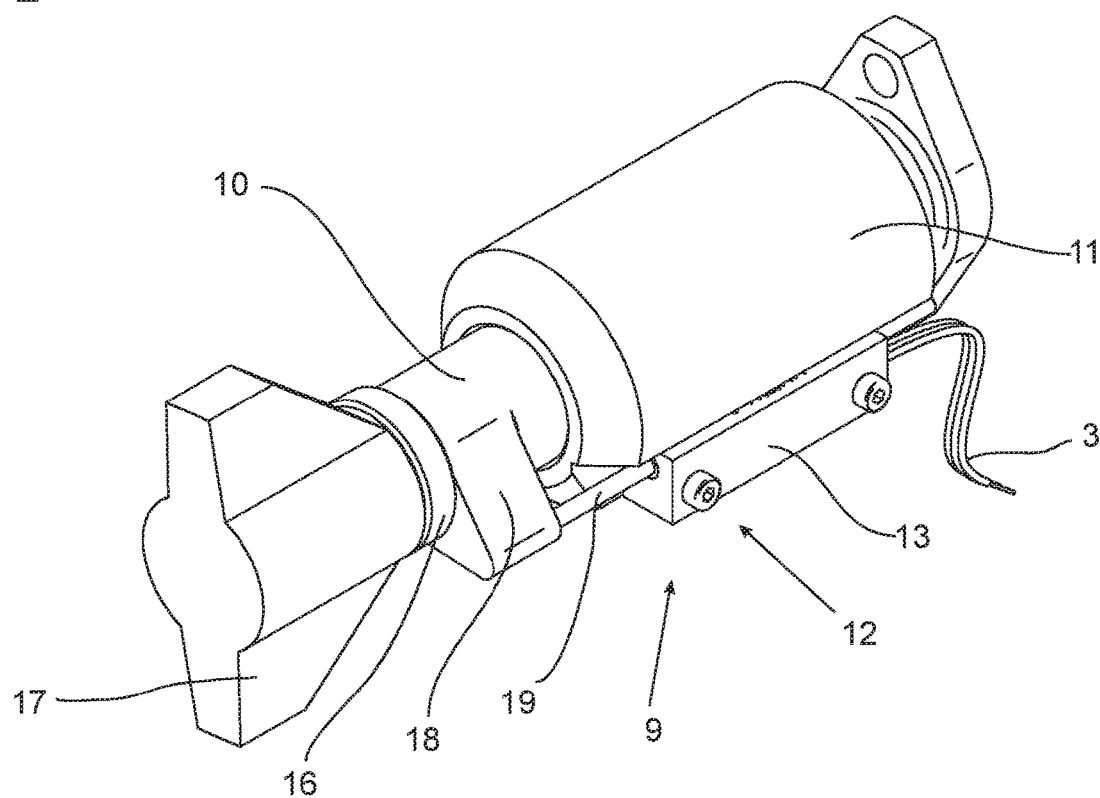
FIG. 2 shows a perspective view of a pressure-limiting valve of the pressure booster according to FIG. 1.
Figure 3:
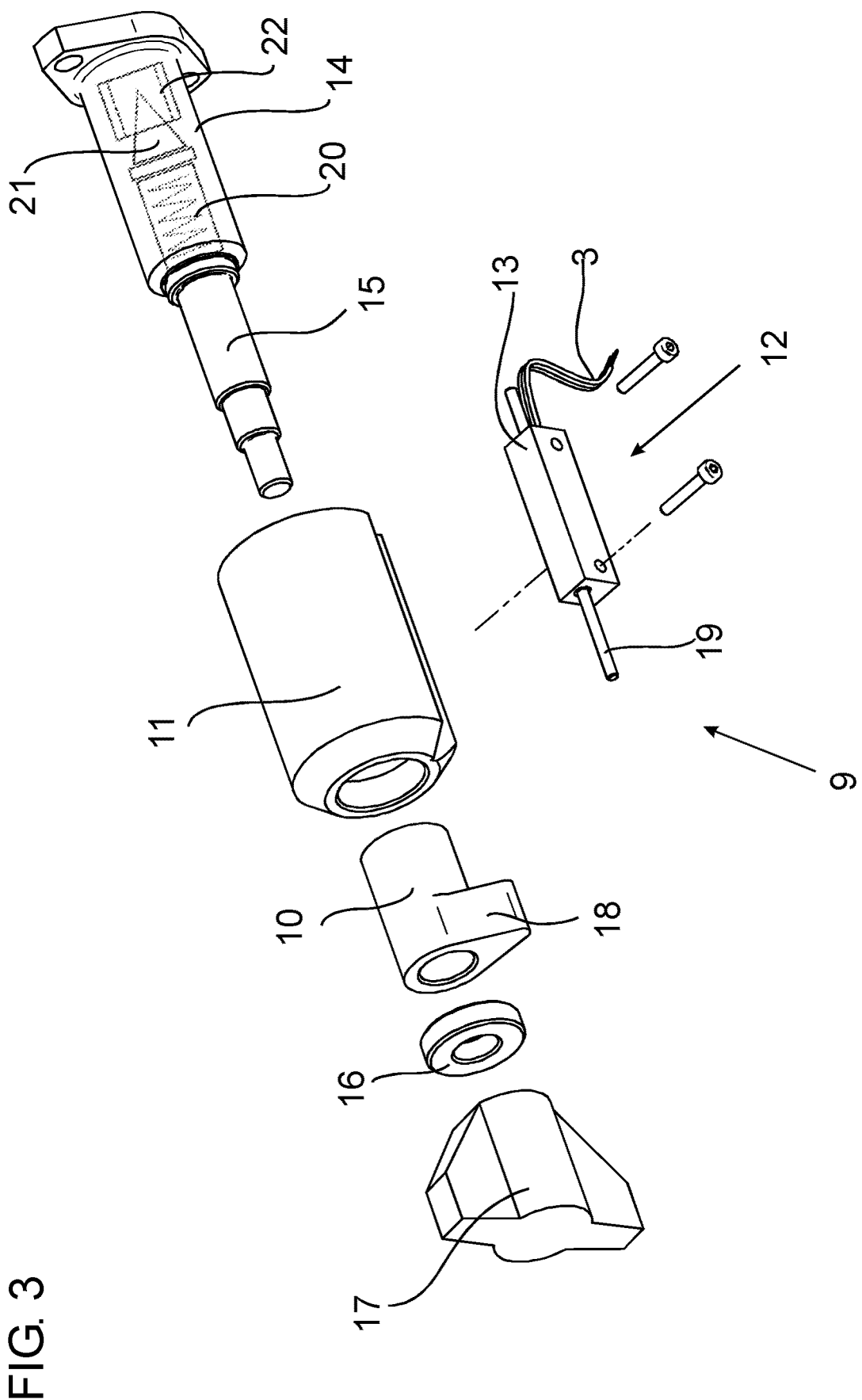
FIG. 3 shows an exploded view of the pressure-limiting valve according to FIG. 2.

The guide sleeve 11, which coaxially surrounds the valve housing 14 of the pressure-limiting valve 9, provides axial guidance for the running sleeve 10, which, with an interposed spacer ring 16, rests against the rotary handle 17. The running sleeve 10 is connected to a stop sleeve 15, which can be displaced axially relative to the valve housing 14, such that a displacement of the running sleeve 10 brings about a corresponding displacement of the stop sleeve 15, wherein the stop sleeve 15 rests against the spring element in the valve interior, which is not shown here, wherein the spring element 20 rests against the closing element, which seals the valve seat and which is likewise not shown here, by its end lying opposite the stop sleeve 15 (cf. FIGS. 2 and 3).

A positional potentiometer 13 of a position detection unit 12, which is arranged on the guide sleeve 11, serves to determine the axial position of the running sleeve 10 and thus the spring pre-tension. This positional potentiometer has a guide rod 19, which is attached to a bracket 18 of the running sleeve 10. The positional potentiometer 13 thus measures a linear, axial displacement of the running sleeve 10 by a change in resistance. The detected change in resistance is relayed via an electrical line 3 to an evaluation unit 6 within a housing 8 of the pressure booster 1.

The evaluation unit 6 in this instance has a microcontroller, in which corresponding hydraulic pressures of the pressure-limiting valve 9 are associated with particular axial positions of the running sleeve or respectively resistance values of the positional potentiometer. The microcontroller of the evaluation unit 6 then converts the recorded resistance value into the set hydraulic pressure, wherein, when determining a resistance value in the range between two resistance values with which a corresponding hydraulic pressure is internally associated, the microcontroller associates a hydraulic pressure with the determined resistance value by interpolation. Moreover, the microcontroller is well-suited to take influencing factors such as temperature into account when converting the axial position of the running sleeve 10 into a set hydraulic pressure.

A display of the set maximum hydraulic pressure is made via an E Ink display 5 of an output unit 4, which is arranged on the upper side of the housing 8 of the pressure booster 1 and easily visible to the user there. The input element 7 allows the user to enter specific inputs.

LIST OF REFERENCE SIGNS

1 Pressure booster
2 Hydraulic port
3 Line (position detection unit—evaluation unit)
4 Output unit
5 Display
6 Evaluation unit
7 Input elements
8 Housing
9 Pressure-limiting valve
10 Adjusting element/running sleeve
11 Guide sleeve
12 Position detection unit
13 Positional potentiometer
14 Valve housing
15 Stop sleeve
16 Spacer ring
17 Rotary handle
18 Bracket
19 Guide rod

The invention claimed is:

1. A pressure booster for driving hydraulic tools, comprising
   a pneumatic unit that is driven by gas or air pressure,
   a hydraulic unit that is connected to the pneumatic unit and that has a hydraulic port for connecting the hydraulic tool to the hydraulic unit in a fluid-tight manner, and
   a pressure-limiting valve for setting the hydraulic pressure, comprising
      a spring element, and
      a displaceable adjusting element for setting a spring force of the spring element,
   a position detection unit that is connected to the adjusting element to detect an axial position of the adjusting element,
   an evaluation unit for determining a set hydraulic pressure as a function of the axial position, and
   an output unit for displaying the set hydraulic pressure, wherein
   the spring element is braced against a running sleeve that is connected to the position detection unit and that is mounted on a valve housing of the pressure-limiting valve such that it can be displaced axially, and
   the running sleeve rests against a rotary handle that is arranged on a threaded section of the pressure-limiting valve.

2. The pressure booster according to claim 1, characterized in that the position detection unit has a positional potentiometer that is connected to the adjusting element.

3. The pressure booster according to claim 1, characterized in that the position detection unit is connected to a microcontroller of the evaluation unit, which associates the axial position of the adjusting element, to a set hydraulic pressure.

4. The pressure booster according to claim 1, characterized in that the evaluation unit is connected to an E Ink display of the output unit.

5. The pressure booster according to claim 1, characterized in that the spring element is formed by a helical compression spring, which is braced against the running sleeve.

6. A pressure-limiting unit for a pressure booster for driving hydraulic tools, comprising a pressure-limiting valve for setting the hydraulic pressure, having
   a spring element, and
   a displaceable adjusting element for setting a spring force of the spring element,
   a position detection unit that is connected to the adjusting element to detect an axial position of the adjusting element, and
   an output unit for displaying a set hydraulic pressure of the corresponding force wherein
   the spring element is braced against a running sleeve that is connected to the position detection unit and that is mounted on a valve housing of a pressure-limiting valve such that it can be displaced axially, and the running sleeve rests against a rotary handle that is arranged on a threaded section of the pressure-limiting valve.

* * * * *